(12) United States Patent
Koren

(10) Patent No.: US 10,646,025 B2
(45) Date of Patent: May 12, 2020

(54) MULTISTRAND LANYARD FOR HANDHELD DEVICES

(71) Applicant: James Thomas Koren, Warminster, PA (US)

(72) Inventor: James Thomas Koren, Warminster, PA (US)

(73) Assignee: Koren Consulting, LLC, Warminster, PA (US)

( * ) Notice: Subject to any disclaimer, the term of this patent is extended or adjusted under 35 U.S.C. 154(b) by 149 days.

(21) Appl. No.: 15/430,472

(22) Filed: Feb. 11, 2017

(65) Prior Publication Data

US 2017/0231373 A1 Aug. 17, 2017

Related U.S. Application Data

(60) Provisional application No. 62/295,022, filed on Feb. 13, 2016.

(51) Int. Cl.
| | |
|---|---|
| *A45F 5/00* | (2006.01) |
| *H04B 1/3888* | (2015.01) |
| *A45C 13/30* | (2006.01) |
| *A45C 11/00* | (2006.01) |

(52) U.S. Cl.
CPC ............... *A45F 5/00* (2013.01); *A45C 13/30* (2013.01); *H04B 1/3888* (2013.01); *A45C 2011/002* (2013.01); *A45F 2005/006* (2013.01); *A45F 2200/0516* (2013.01)

(58) Field of Classification Search
CPC .......... A45F 2005/006; A45F 2005/008; A45F 2200/0516; A45F 2200/0508; A45F 2200/0525; A45F 2200/0533; A45F 5/00

USPC .......................................... 224/217–221, 267
See application file for complete search history.

(56) References Cited

U.S. PATENT DOCUMENTS

| | | | | |
|---|---|---|---|---|
| 5,709,665 | A | * | 1/1998 | Vergano ............... A61G 7/0503 128/DIG. 26 |
| 8,523,031 | B2 | * | 9/2013 | Hedrick .................... A45F 5/00 224/257 |
| 2002/0157172 | A1 | * | 10/2002 | Matsushima ........ D03D 1/0094 2/311 |
| 2006/0113345 | A1 | * | 6/2006 | Zoullas ..................... A45F 5/00 224/600 |
| 2006/0186150 | A1 | * | 8/2006 | Willows .................... A45F 3/00 224/222 |
| 2010/0171021 | A1 | * | 7/2010 | Smith .................... A45C 13/30 248/558 |
| 2010/0236886 | A1 | * | 9/2010 | Herold ..................... A45C 5/14 190/18 A |

(Continued)

FOREIGN PATENT DOCUMENTS

| | | | | |
|---|---|---|---|---|
| JP | 2000079012 | A | * | 3/2000 |
| JP | 2003111611 | A | * | 4/2003 |

*Primary Examiner* — Scott T McNurlen
(74) *Attorney, Agent, or Firm* — Pinnacle IP Strategies, LLC

(57) ABSTRACT

Provided are lanyards for a handheld electronic device featuring a loop section having a section of braided or woven strands of fiber and having a section of very thin profile being adapted for fitting between a handheld device and a case or cover placed thereon. The lanyards can be used with existing cases or covers. The lanyards are very strong, lightweight and help prevent damage to or loss of the handheld devices.

19 Claims, 3 Drawing Sheets

(56) References Cited

U.S. PATENT DOCUMENTS

| | | | | |
|---|---|---|---|---|
| 2015/0305480 A1* | 10/2015 | Brousseau | ............... | A45F 5/10 |
| | | | | 224/267 |
| 2016/0000211 A1* | 1/2016 | Reyes | ................... | A45C 13/30 |
| | | | | 224/259 |
| 2016/0286942 A1* | 10/2016 | Peterson | .................. | A45F 5/00 |
| 2016/0344437 A1* | 11/2016 | Gordon | ............... | H04B 1/3888 |
| 2018/0294830 A1* | 10/2018 | Osmanski | .............. | A45F 5/021 |

* cited by examiner

A.

B.

A.

B.

MULTISTRAND LANYARD FOR HANDHELD DEVICES

CROSS-REFERENCE TO RELATED APPLICATIONS

This claims benefit of U.S. Provisional Patent Application No. 62/295,022, filed Feb. 11, 2016, the entirety of which is incorporated by reference herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION-BY-REFERENCE OF MATERIAL SUBMITTED VIA EFS-WEB

Not Applicable.

STATEMENT REGARDING PRIOR DISCLOSURES BY THE INVENTOR

Not Applicable.

BACKGROUND OF THE INVENTION

Field of the Invention

This relates generally to lanyards for handheld personal electronic devices, such as smart phones. More specifically it relates to simple multi-strand lanyards for use with smart phones, tablets, and other handheld electronic devices.

Description of Related Art

Handheld personal electronic devices such as smart phones, digital cameras, tablet computers, and the like are nearly ubiquitous. These devices have become increasingly small and lightweight, and yet contain fragile screens and electronics that can be damaged if the device is dropped. Many people use protective cases or covers in conjunction with their handheld devices to prevent such damage.

In the past, protective cases often included wrist straps, neck straps, or the like (collectively "lanyards"). In other cases the protective cases included attachment means allowing the user to connect/attach an after-market lanyard. Such attachment means could be as simple as a receiver that allowed the user to screw in a lanyard with a threaded end, or a place to hook a lanyard with an end adapted to hook to a device. However, as the later generation handheld devices have become lighter, smaller, and thinner, many case manufacturers have chosen to provide a light-weight case or cover with a thin profile so as not to add unwanted bulk or weight that may put off consumers wishing to maintain the thin profile and lightweight feel that the devices feature in the absence of a case.

Thus, many cases or covers for newer generation smart phones and other handheld devices do not include a lanyard, nor a means to attach a lanyard. Moreover, owners of handheld devices often are fond of their protective covers, which in many cases are personalized, so that merely changing to a different case or cover may not be an acceptable option. Unfortunately, despite the fact that handheld devices even with cases or covers may not feature a wrist strap or other lanyard, consumer still use them for their many possible functions including voice services, music, video applications, photography, location service (e.g. GPS), messaging service (e.g. SMS), social media, and more. As a result, owners of hand-held devices may accidentally drop their device causing damage, including broken screens, scratched lenses, electronic malfunction, water damage, or even complete physical loss (e.g. dropping the device into a body of water, or even into a bathtub or toilet, out of a moving vehicle, into an inaccessible area, theft, or forgetfulness).

There is a need for new and improved lanyards that are adapted to work with lightweight handheld digital devices with or without the cases and covers used to protect them.

BRIEF SUMMARY OF THE INVENTION

This disclosure provides lanyards for handheld digital devices. The lanyards generally comprise a plurality of fiber strands, which may be monofilament or multifilament, and may be in the form of yarns, cords, braids, or the like, with or without a core. The lanyards can be made from any type of fiber useful for such purposes.

In a first aspect, provided herein are lanyards for handheld electronic devices. The lanyards comprise first and second sections, and a junction therebetween.

The first section comprises a region of braided or woven strands of fiber. The braided or woven strands form a loop that has sufficient diameter and strength to secure the handheld device during use by a user.

The second section comprises a plurality of strands extending from the first section. In the second section are at least partially separated, unbraided, or unwoven from each. The separated, unbraided, or unwoven strands form a thin layer that comprises the at least partially separated strands substantially adjacent to each other (e.g. side-by-side, so as to form a thin layer).

The lanyards also comprise a junction between the region of braided or woven strands and the at least partially separated strands. The junction comprises a retainer to prevent the region of braided or woven strands from unraveling e.g. from becoming unbraided or unwoven.

In a second aspect of the invention, multi-strand lanyards for handheld electronic devices are provided. Generally, the lanyards comprise a plurality of fiber strands extending through at least a first, second, and third segment of the lanyard.

The first segment comprises a plurality of the fiber strands collectively forming a loop for wearing by an operator of the handheld device The second segment is disposed between the first and third segments and connects them at last via multiple fiber strands. The second segment comprises a region adapted for passing between the handheld device and a case or cover thereon wherein multiple fiber strands are substantially separated from each other therein so as to minimize the thickness or bulk of the second segment, while providing extensive flexibility and substantial strength.

The third segment comprises a substantially flat region sufficiently thin so as to fit between the handheld device and a case or cover thereon without substantially adversely affecting the fit of the case or cover onto the handheld device. The third segment comprises at least a portion of the individual strands adhered side-by-side. The strands may be adhered with any suitable adhesive, such as an adhesive incorporated into or onto a substrate (e.g. adhesive tape or similar structure), or with an adhesive that cures to form the flat region.

The lanyard further comprises a junction between the first and second segments. The junction comprises means for drawing the separated strands together or retaining the loop. Thus, at the junction, the fiber strands that are separated in the second segment are drawn together or held together to allow them to become part of the loop and/or fiber strand structure leading to the loop.

The lanyard may further comprise a repositionable or removable adhesive for attaching the lanyard to the handheld device and/or its case or cover via the third segment to provide additional functionality.

Also disclosed herein are kits comprising a lanyard according to either of the prior aspects and one or more of a case or cover for a handheld digital device suitable for use with a lanyard, adhesives for attaching the lanyard to the handheld device, or the case or cover, instructions for use of the kit components, and links to a website or online audio-visual materials providing additional information on using the lanyard, or using the components of the kit.

The lanyards and the kits provided herein may conveniently be used for securing handheld devices for a user whether with or without a case or cover.

It is thus an object of this disclosure to provide lanyards that can help users protect their handheld digital devices from damage or loss due to accidental drops or the like.

It is also an object of this disclosure to provide lanyards that can be used with recent model lightweight handheld electronic devices, particular those that currently have cases or covers that do not include lanyards or lanyard attachment means.

It is a further object of this disclosure to provide lanyards with very low clearance such that they can fit between a handheld electronic device and a case or cover.

It is yet another object of the present disclosure to provide lanyards as part of kits for use with handheld electronics, to facilitate the installation and use of lanyards for protecting the functionality and physical integrity of the devices.

These and/or further aspects, features, and advantages of the present invention will become apparent to those skilled in the art in view of this disclosure.

DETAILED DESCRIPTION OF THE INVENTION

Figure 1:
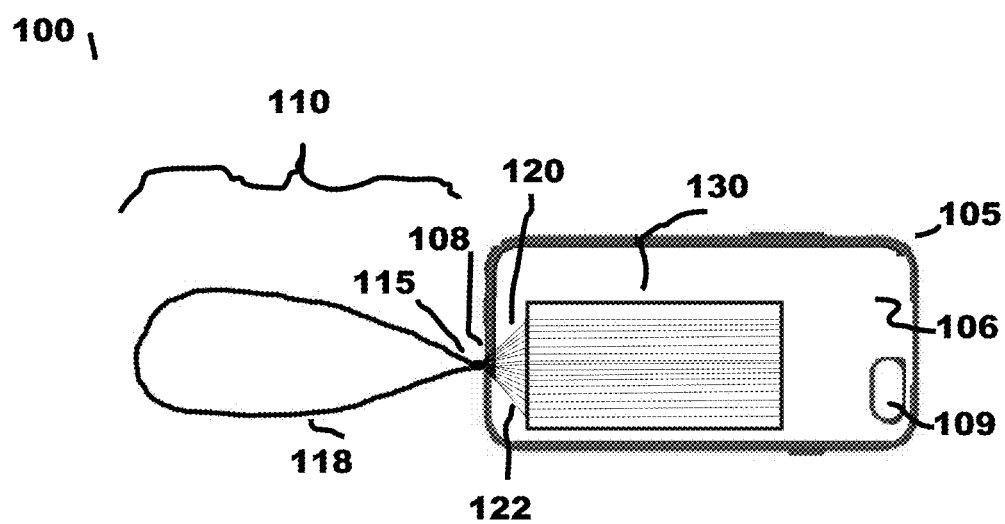
FIG. 1 depicts a plan view of an embodiment of the lanyard, showing the major structural elements and showing the retaining section attached to a case for a handheld electronic device, such as a smartphone.

The present disclosure provides simple lanyard apparatus for use with handheld devices. The lanyards provide convenience and a measure of security, particularly against dropping, losing, or misplacing the handheld devices. The inventor has surprisingly discovered that lanyards of the design(s) and structure(s) of those disclosed herein are particularly adaptable to use with a handheld device such as a smart phone with an existing case or cover. Moreover, the lanyard apparatus provides control of the device while allowing a very free 'feel' so that the device does not bind, or twist, and the user's interaction with the device feels natural and not stiff.

Definitions & Abbreviations

Unless expressly defined otherwise, all technical and scientific terms, terms of art, and acronyms used herein have the meanings commonly understood by one of ordinary skill in the art in the field(s) of the invention, or in the field(s) where the term is used. In accordance with this description, the following abbreviations and definitions apply.

The following abbreviations may be used herein:
cm: centimeters;
GPS: geopositioning service;
LED; light emitting diode;
mil: $1/1000^{th}$ of an inch;
mm: millimeters;
paracord: parachute cord;
PU: polyurethane;
SMS: short message service;
URL: uniform resource locator;
WIFI wireless fidelity As used herein, the singular form of a word includes the plural, and vice versa, unless the context clearly dictates otherwise. Thus, the references "a", "an", and "the" are generally inclusive of the plurals of the respective terms. For example, reference to "a member" or "a method" includes a plurality of such "members" or "methods."

The words "comprise", "comprises", and "comprising" are to be interpreted inclusively rather than exclusively. Likewise the terms "include", "including" and "or" should all be construed to be inclusive, unless such a construction is clearly prohibited from the context. Further, forms of the terms "comprising" or "including" are intended to include embodiments encompassed by the phrases "consisting essentially of" and "consisting of". Similarly, the phrase "consisting essentially of" is intended to include embodiments encompassed by the phrase "consisting of".

As used herein, the term "fiber" means any type or kind of fiber that may be useful herein, particularly synthetic fibers, natural fibers, metallic fibers, or any combination thereof. In certain embodiments, the fiber strands can comprise yarns, such as spun yarns or filament yarns. Synthetic fibers comprising nylon or other polymers comprising aliphatic or semi-aromatic polyamides, Kevlar, polyester, polyethylene terephthalate (PET), polyamide, rayon, or a conjugation comprising polyester, polyamide, polypropylene, and/or polyurethane are suitable for use herein. At least a portion of the fibers in certain embodiments comprise parachute cord of Type I, IA, II, IIA, III, IV, produced in accordance with the technical standard specified as MIL-C-5040H, or parachute cord made in accordance with a standard published or accepted by the Parachute Industry Association. In one embodiment, a braided, 4-strand polyurethane cord is useful. Nothing herein requires that all of the fibers or fiber strands used in any particular embodiments are the same in terms of composition, type, source, diameter, strength, or other attributes. In various embodiments, where desired, at least a portion of the fibers are natural fibers are animal fibers or plant fibers. Animal fibers suitable for use herein include alpaca, angora, cashmere, llama, mohair, silk, sheep's wool, hair from bison, camel, cat, dog, musk ox, possum, rabbit, wolf, and yak, as well as feathers. Plant fibers suitable for use herein agave, bamboo, banana, coconut coir, corn, cotton, flax, hemp, jute, kapok, kenaf, nettle, ramie, pineapple, sisal, and soy. In certain embodiments, at least a portion of the fibers comprises metal, plastic-coated metal, metal-coated plastic, or include a core completely or partially covered by metal.

As used herein, the term "handheld device" (also referred to herein as "handheld electronics," "handheld devices," "portable digital devices" and similar names), means any device that can be held in the hand(s) during routine use and includes smart phones (with or without a case or cover), tablets, mini-tablets, small laptop or notebook computers, hybrid tablet/laptop devices, MP3 players, digital cameras, GPS devices (including personal location devices), walkie-talkies and similar communication devices, and the like. Moreover, the term "handheld device" should be considered broad enough to include other handheld items that may not necessarily be an electronic device but which have become handheld in our culture and for which a lanyard would be useful.

As used herein, the term "strand" means one or more fiber structures each of which can serve as a separate unit. Strands suitable for use herein include woven, braided, wrapped, or unwoven strands, depending on the fiber material and its properties. Presently preferred strands are generally woven strands. Strand may be monofilament or multifilament. By way of example, a rope may have multiple strands that can be readily separated (e.g. unraveled or unbraided). Depending on the structure of the rope, each of the strands may themselves comprise multiple strands comprising multiple fibers. Thus as used herein, 'strand' and 'fiber' may be synonymous in some instances and different in other instances. The skilled artisan will understand from any given context whether a strand is a single fiber or a structure comprising multiple fibers. In a more specific example, any given strand of kernmantle rope, such as parachute cord or paracord, will itself comprise multiple strands and fibers. The fibers in any given multi-strand structure need not be identical. Some strands may feature a core surrounded by one or more fibers, where the core is either a different fiber material, or has a different diameter or other properties. In one embodiment Where used herein, ranges are provided in shorthand, so as to avoid having to list and describe each and every value within the range. Any appropriate value within the range can be selected, where appropriate, as the upper value, lower value, or the terminus of the range.

The methods and devices and/or other advances disclosed here are not limited to particular methodology, protocols, and/or structures described herein because, as the skilled artisan will appreciate, they may vary. Further, the terminology used herein is for the purpose of describing particular embodiments only, and is not intended to, and does not, limit the scope of that which is disclosed or claimed.

Process steps, method steps, algorithms or the like may not necessarily be described in sequential order, and unless expressly stated otherwise, such processes, methods, and/or algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

Although any devices, methods, articles of manufacture, or other means or materials similar or equivalent to those described herein can be used in the practice of the present invention, the preferred compositions, methods, articles of manufacture, or other means or materials are described herein.

Any patents, patent applications, publications, technical and/or scholarly articles, and other references cited or referred to herein are in their entirety incorporated herein by reference to the extent permitted under applicable law. Any discussion of those references is intended merely to summarize the assertions made therein. No admission is made that any such patents, patent applications, publications or references are prior art, or that any portion thereof is either relevant or material to the patentability of what is claimed herein. Applicant specifically reserves the right to challenge the accuracy and pertinence of any assertion that such patents, patent applications, publications, and other references are prior art, or are relevant, and/or material.

Description of Illustrative Embodiments

In a first of several aspects, lanyards are provided for use with handheld electronic devices. The lanyards generally comprise first and second sections, with a junction between them. The first section comprises a region of braided or woven strands of fiber forming a loop. The loop is preferably of sufficient number, size (such as diameter, cross-sectional area and/or other measures of size), and strength (tensile strength, ultimate tensile strength, or other measures of fiber strength) to secure the handheld device—such as during use by a user. The number of strands employed in such manner will depend on the relative strength of each strand, as well as the size of the individual strands.

The second section comprises a plurality of strands extending from the first section. The strands extending from the first section into the second section are at least partially separated, unbraided, or unwoven from each other. The separated strands can form a thin layer comprising the at least partially separated strands substantially adjacent to each other (e.g. side-by-side in a flat arrangement).

The lanyards also comprise a junction located between the region of braided or woven strands (in the first section) and the at least partially separated strands (in the second section). The junction generally comprises a retainer for preventing the region of braided or woven strands from becoming unbraided or unwoven. The retainer can comprise anything that will retain the strands of fiber together from the loop section to minimize or prevent them from separating, unraveling, or the like. The junction may simply comprise one or more knots structures employing the strands themselves to secure the braided or woven portion and prevent unraveling, or the junction may involve a separate retaining structures ring, band, crimp, bead, thread or strand, stitching, or the like. The junction may comprise any convenient or useful material(s) such as fiber, metal, plastic, wood, or other natural or other synthetic materials.

The skilled artisan will appreciate that the strength of any given fiber may be moisture dependent, and accordingly, fibers preferred for use herein will have sufficient strength at a range of moistures, particularly those moistures likely to be encountered in actual use of such devices. Moreover, the choice of a given fiber may be influenced by the moisture content present for a particular usage.

In various embodiments, the at least partially separated strands are adjoined, attached, or adhered, or embedded, in or on the thin layer. In one embodiment they are adhered to thin layer substrate or matrix. In another embodiment, the side-by-side strands together with an adhesive layer or other material form the thin layer.

In one embodiment, the thin layer further comprises an adhesive for securing the lanyard to the handheld device, or a case or cover used therewith. The adhesive comprises a one-sided or two-sided adhesive tape in certain embodiments.

In one embodiment the handheld device does not include a case or cover. In another embodiment a case or cover are presently used with the handheld device.

The lanyard can include an adhesive comprising repositionable properties for removably securing the lanyard to the handheld device or a case or cover used therewith. Such adhesives are known in the art. These embodiments are particularly useful where the user desires a lanyard only on occasion and wants to be able to remove the lanyard at other times. They are also useful where a user wants the option of using a favorite lanyard with multiple devices—each at a different time by simply moving the lanyard from one device to another.

The lanyard in certain embodiments further comprises a section positioned between the first and second section. Preferably, the at least partially separated strands in this section remain free (i.e. they are not adjoined, attached, or adhered, or embedded in or on the thin layer). In such embodiments, the at least partially separated strands can be conveniently used with handheld devices with cases. The free separated strands can be readily passed through a case or cover, e.g. through an existing hole or opening, or between the case or cover and the handheld device. In such embodiments, it is generally preferably that the strand be compressible so that they readily be passed through or between small openings or clearances.

In other embodiments, the first section of the lanyard further comprises a leader portion comprising a plurality of strands or fiber disposed between the junction and the loop. In yet other embodiments, the first section may include both the loop and an unlooped section such as a leader, or may consist substantially of single loop. In various embodiments, the section may be braided or woven, in any pattern, shape, or design. In various embodiments, the loop may have a largely 'flat' or strap-like structure, or a 'rounder' or rope-like structure, or any other shape or design that is functional as a lanyard (e.g. for wearing on the user's wrist). The pattern, shape, or design may also be driven by comfort to a user, desirability by consumers, or the like. Similarly, the first section may comprise strands of one or more colors such that the final woven or braided portions have a color or color pattern that is appealing.

In one embodiment, the second section can further comprise a decorative element. Decorative elements can comprise a color or design, a screened or printed pattern, or a label with any manner of graphics thereon. In one example of such an embodiment, the second section can comprise a thin polyester laser-printable label. The label can be added to the top of thin layer, or an adhesive used to adhere the strands. This label may comprise a color logo, printing (such as a company name, web site/URL, contact information (e.g. a telephone number or email address), patent markings, and the like). Such labels are preferably thin. In one embodiment they are less than about 4.0 mils thick. The thickness of the combined thin layer (e.g. adhesive(s), and strands, as well as any labels) should be kept to a reasonable minimum, as the skilled artisan will appreciate. In one embodiment, the total thickness of such layer will be less than about 26 mils thick (less than 1/32 of an inch).

In another aspect, this disclosure provides lanyards that generally comprise a loop section, a junction, a separated section, and a retaining section.

The loop section comprises at least a length of braided or woven strands of fiber and having a loop therein of sufficient net diameter and strength for a user of the handheld device to use the loop to secure the device. The junction secures the braided or woven section. The lanyards' separated section comprises a plurality of strands of the loop section that have been at least partially separated or unbraided or unwoven. The retaining section comprises a thin layer securing the at least partially separated strands extending from the separated section to the retaining section adjacent to each other.

The separated section generally comprises an area where at least a portion of the strands present in the loop section are separated from the braid or weave, and from each other. In a preferred embodiment, the separated strands will be of a small enough thickness so as to conveniently pass between the handheld device and a case or cover thereon without interfering with the fit thereof, even where such case or cover has a relative tight tolerance as is often true with current cases and covers for these devices, many of which are retained with a 'snap' fit.

Accordingly, the skilled artisan will appreciate that for embodiments of lanyards disclosed in the several aspects herein preferred strands may have relatively small diameters. In one embodiment, the separated strands have a diameter of less than about 5 mil. In various embodiments the diameters of the strands may be less than about 5, 4, or even 3 mil. In other embodiments, the separated strands may have diameters less than about 2.5, 2, or even 1.5 mil. In yet other embodiments, the separated strands have a diameter less than about 1 mil. The skilled artisan will also appreciate for any given fiber material, the smaller diameter strands will have less tensile strength, which is function of the material and the cross-sectional area of the strand. Thus, there is a tradeoff between thickness and strength. The thinner the strands in the separated section of the lanyard, the more strands that may be required to provide the net strength desired to make the lanyard apparatus acceptably or sufficiently strong to adequately secure the handheld device. Thus the skilled artisan will understand how to balance the strand diameter, strand strength, and strand number to achieve the desired properties for the separated section and the lanyard apparatus. Moreover, the skilled artisan will appreciate that some of the materials available may allow very strong lanyards to be produced with relatively few strands.

The separated section preferably comprises strands that provide flexibility in addition to strength. The plurality of strands are the primary connection between the lanyard and the handheld device and preferably provide sufficient flexibility so that the user is not present with any discomfort, or stiff feel in the lanyard and movement or handling of the device.

The skilled artisan will also appreciate that not every strand of fiber present in the loop section need be separated and pass through the separated section to the retaining section. In one embodiment, the lanyard apparatus comprises a loop section having a plurality of strands that are braided, woven, or otherwise incorporated into the loop that are not present in the separated section or the retaining section.

The strands that are separated from the junction to the separated section extend into the retaining section where they ultimately become associated with a thin layer. For various embodiments of lanyards disclosed in the several aspects of this disclosure, the thin layer may consist of the strands along with adhesive (e.g. in the form of adhesive strips or similar adhesive on a substrate) or may result when the strands are embedded into a thin layer of material or adhered to a thin layer of support material. The thin layer may be formed in situ for example with an adhesive or curable material such as an epoxy, curable polymer (e.g. UV curable material), or the like that will harden or cure to form the layer. In such embodiments, the strands are combined with the material such that they are embedded in the thin layer and thus secured. Preferably the strands are arranged adjacent to each other (e.g. side-by-side) along the thin layer so that the retaining section is not substantially thicker than the diameter of a single strand. In some embodiments the strands may be straightened, stretched, or even placed under tension to minimize the thickness of the thin layer.

The thin layer may also be preformed in other embodiments. Such layers may comprise a substrate plastic or other synthetic material. Preferably the thin layer is not conductive and will not cause any interference with the operation or functionality of the handheld e.g. transmission of electrical signals, radio signals, cellular signals, WIFI connectivity, or the like. Where the thin layer is preformed, the strands are attached with a suitable adhesive that can be applied to the layer. Adhesive tapes may be convenient for such purposes. Alternatively, the strands may be attached through use of one or more of glue, VELCRO, crimps, snaps, hooks, sonic welding, or via retaining members. As described above, the strands are preferably adhered side-by-side to maintain a thin profile. The strands are preferably attached in a non-removable or 'permanent' fashion to the thin layer to keep the retaining section as thin as possible.

In some embodiments, the retaining section may be attached to an inside surface of a case or cover that is used with the handheld device. The attachment may be permanent, semi-permanent or freely repositionable/removable. In other embodiments, the retaining section may be adhered directly to the handheld device, e.g. where no case or cover is to be used. In such cases, the attachment is preferably semi-permanent or removable. The attachment to the case or cover, or alternatively the handheld device can be conveniently made by adhesive such as adhesive tape. In some embodiments, the lanyard may additionally comprise an adhesive for such purposes, such as an adhesive tape or a double-sided adhesive tape. In other embodiments, the lanyard apparatus features a sticky surface on at least one side of the retaining section, which may be covered with a removable protective layer prior to application. The protective layer can be removed and the retaining layer can be adhered to the desired surface, e.g. an inner surface of a case or cover or an outer surface of the handheld device. It will be understood that in any case the retaining layer should be adhered only where it will not interfere with any operation or functionality of the handheld device, e.g. the retaining section should not cover or interfere with any camera lens, flash, light, microphone, antenna or the like. In addition, where a case or cover are used, the retaining section may be positioned so that the separated section is arranged to pass advantageously through an opening or other desired area of the case or cover. The skilled artisan will understand that such positioning will determine the location/orientation of the lanyard apparatus, and thus the loop section. The skilled artisan will also appreciate the description in this paragraph in particular, and throughout the disclosure generally applies equally to the corresponding structure of the other aspects of this disclosure.

In some embodiments, the lanyard may further comprise a repositionable adhesive for removably securing the lanyard to the handheld device. The repositionable adhesive is preferably used in connection with the retaining section and either handheld device or a cover or case thereon. Repositionable adhesives are known in the art and in general will allow the lanyard apparatus to be attached and retained on the surface to which it is attached with sufficient strength for most purposes but will also allow the adhesive to fairly easily pulled off of the attachment points by the user without substantial or permanent damage thereto. Thus the repositionable adhesive may have greater affinity for or bonding strength with itself than it does for/with the surface(s) to which it is attached. As described above, the attachment of the lanyard apparatus to the device should be carefully considered to avoid interfering with any operation or function of the device, as well as to optimally orient the lanyard apparatus and the loop with respect to the device.

Specific examples of the adhesives useful herein for various embodiments include commercially-available products such as 468MP High Performance Acrylic Adhesive 200MP (a 3M product), an adhesive product which has a permanent adhesive on one side which is useful for adhering the strands. This adhesive is 5.2 mils thick. A permanent adhesive suitable for use herein is Sheet Polyester Label Material (also a 3M product). This adhesive is useful, e.g. on to help secure the strands. In one embodiment, a polyester label with a clear laminate and permanent adhesive (3M's 7980) on one side is placed over the strands and pressed together to encapsulate the stands between the two permanent adhesive layers.

Another exemplary adhesive is 9425HT (also available from 3M), features a repositionable tape with a medium tack adhesive on the backside (i.e. the repositionable portion), and a high tack ("permanent") adhesive on the face side, which can be used to encapsulate the strands. This adhesive is used in one presently preferred embodiment. The latter can be combined with the 468MP adhesive (also 5.2 mils thick) or the 7980 adhesive.

In one embodiment, the retaining section is not attached to either the handheld device or the case or cover, but rather is merely retained between the handheld device and the case or cover by the forces that keep the case or cover on the handheld device. Such embodiments will be most useful or practical in applications where a case or cover fits very tightly to the handheld for which it is designed. For example via a tight 'snap' fit, locks, or mechanisms that hold the case or cover securely to the handheld device.

In one embodiment, the fiber comprises paracord or similar lightweight cord. In another embodiment, at least a portion of the fiber comprises paracord or similar lightweight cord.

In one embodiment, at least a portion of the fiber comprises a dynamic or static rope. In certain embodiments the lanyard apparatus comprises rope that has a kernmantle structure. Such structures are known in the art, and are well-suited to unraveling or separating of strands that is useful therein.

The lanyard in various embodiments includes rope that comprises nylon or other polymers comprising aliphatic or semi-aromatic polyamides, or Kevlar. The inventor has found such polymers useful for making lanyards herein.

In a presently preferred embodiment, the lanyard fiber comprises polyurethane, more particularly a braided, four-stranded, polyurethane cord.

In one embodiment, the lanyard apparatus further comprising a means of adjusting the loop size. Such means are well-known in the art and include springs, clasps, clips, tensioners, retaining beads, adjustable knots and the like. Preferably such devices for adjusting the loop size are simple to use (e.g. intuitive), durable, and low-cost.

The lanyards for the forgoing aspect of the invention may be also understood by reference to the drawings. With reference to FIG. 1, it can be seen that an embodiment of a lanyard 100 is shown. The lanyard 100 in shown in connection with a smartphone case 105 and comprises a loop section 110, a separated section 120, and a retaining section 130. Junction 115 can be seen in its role for joining the separated strands 122 and preventing the braided or woven strand 118 from separating or unraveling. In a presently preferred embodiment, junction 115 comprises a 'crimp on' metal retaining ring. Retaining section 130 is adhered to an inner surface 106 of the smartphone case 105. The separated section 120 passes through the smartphone case 105 at an opening 108 (which may be adapted for a ear buds, microphone, or charger(s)) or simply by passing between the smartphone case 105 and a handheld device (not shown) to which it is attached. Another opening 109 can be seen. It should be noted that the lanyard 100 and more particularly the retaining section 130 do not occlude, block, or interfere with such opening, which may be adapted for a camera lens and or flash/light LED.

As can be seen, in such an embodiment, the case can be used on different devices while the lanyard remains connected with the smartphone case 105.

Figure 2:
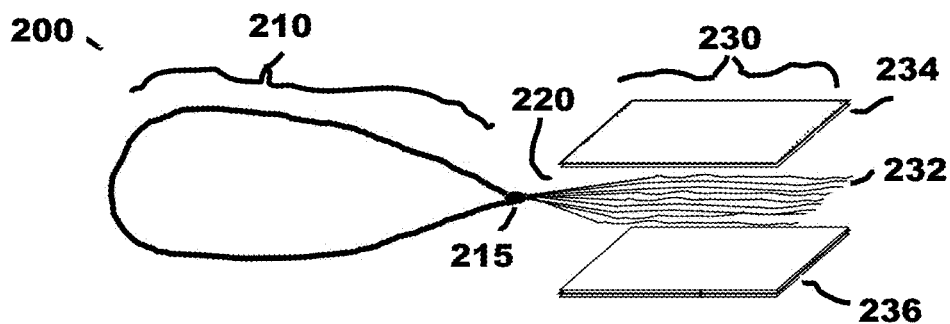
FIG. 2 is a diagram of an embodiment of a lanyard in accordance with the disclosure, showing an exploded third segment with adhesive layers and strand layer.

With further reference to the figures, FIG. 2 shows an embodiment of a lanyard 200 showing the first, second, and third segments (corresponding approximately to the loop section, separated section, and retaining section respectively, and labeled 210, 220, 230) and the junction 215. The retaining section 230 is shown as several layers separated in an exploded view. Strand layer 232 comprises the straightened strands shown side-by-side and ready for attachment to an adhesive layer 234, comprising one or more adhesive strips or material for embedding the strand layer 232. Also shown is an optional adhesive layer 236 that can further 'sandwich' the strand layer 232 to form the completed intact 'thin layer' comprising the strands and adhesive. The optional adhesive layer 236 is a repositionable adhesive layer in some embodiments and can be used to attach the retaining section 230 to either the case/cover (not shown) or the handheld device (not shown).

In another aspect, this disclosure provides lanyards for handheld digital devices comprising a plurality of fiber strands extending through at least a first, second, and third segment.

The first segment comprises a plurality of the fiber strands collectively forming a loop for wearing by an operator of the handheld device. The first segment may contain an unlooped leader of a desired length that extends from the loop to a junction adjacent to the second segment.

The second segment is disposed between and connects the first and third segments. The second segment comprises a region adapted for passing between the handheld device and a case or cover thereon wherein multiple fiber strands are substantially separated from each other therein so as to minimize the thickness of the second segment. The separated strands may pass through an opening in the case or cover, or they may pass between the case or cover and the handheld device.

The third segment has a substantially flat region comprising the separated strands that extend from the second segment. The strands are adhered side-by-side such that the third segment is thin enough to fit between the handheld device and a case or cover thereon without substantially adversely affecting the fit of the case or cover onto the handheld device.

The lanyard also comprises a junction (see above) between the first and second portions comprising means for drawing the separated strands together or retaining the leader and/or loop and to prevent separation or unraveling of strands in the first segment.

In various embodiments, the lanyard of this aspect further comprises an adhesive adapted for attaching the third segment to at least a portion of case or cover, or to the handheld device that is covered by the case or cover thereon. The adhesive is a removable or repositionable adhesive in certain embodiments. In other embodiments, the adhesive is not repositionable but rather is 'permanent'.

In various embodiments, the adhesives may be provided as adhesive strips and may or may not be part of the third segment, which as described above may be formed by adhering the separated strands side-by-side with adhesives, including adhesive strips.

In various embodiments of the lanyard, at least a portion of the fiber strands comprise yarns. The yarns are preferably spun yarns or filament yarns.

The fibers, in certain embodiments comprise synthetic fiber, natural fibers, metallic fibers, or any combination thereof. In one embodiment, at least a portion of the fibers are synthetic fibers comprising nylon or other polymers comprising aliphatic or semi-aromatic polyamides, Kevlar, polyester, polyethylene terephthalate (PET), polyamide, rayon, polyurethane, or a conjugation comprising polyester, polyamide, and polypropylene.

In a presently preferred embodiment, the fibers comprise parachute cord of Type I, IA, II, IIA, III, IV, in accordance with the technical standard specified as MIL-C-5040H, or parachute cord in accordance with a standard published or accepted by the Parachute Industry Association.

In another presently preferred embodiment, polyurethane fibers are used. The inventor has determined that a braided, 4-strand, polyurethane cord provides a useful fiber.

In certain embodiments, at least a portion of the fibers are natural fibers are animal fibers or plant fibers. In one embodiment, at least a portion of the fibers are animal fibers comprising alpaca, angora, cashmere, llama, mohair, silk, sheep's wool, hair from bison, camel, cat, dog, musk ox, possum, rabbit, wolf, or yak, or feathers. In another embodiment, at least a portion of the fibers are plants fibers comprising agave, bamboo, banana, coconut coir, corn, cotton, flax, hemp, jute, kapok, kenaf, nettle, ramie, pineapple, sisal, or soy.

In various embodiments of the lanyards of this aspect, the loop comprises fiber strands that are braided, woven, or knotted.

The lanyards in one embodiment further comprise a means of adjusting the loop size.

Figure 3:
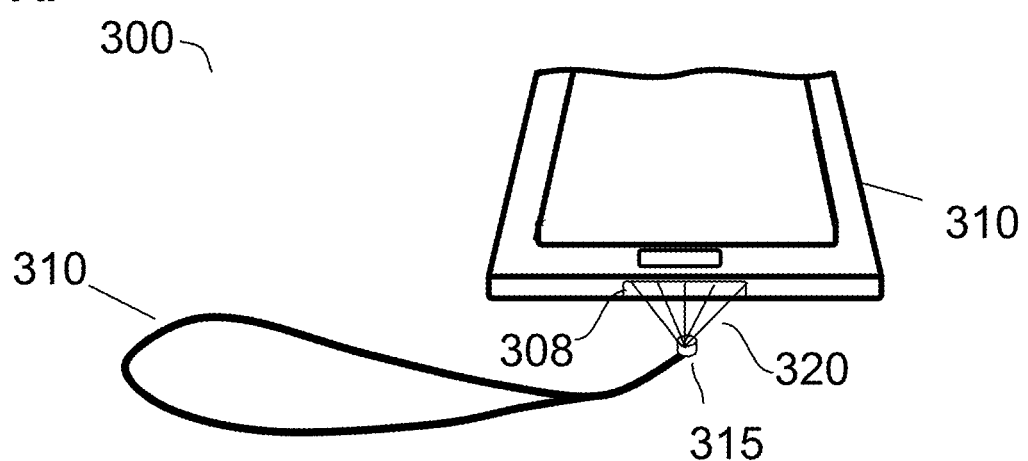
FIG. 3 shows a photograph of an illustrative example of a lanyard according to the disclosure in actual use. Panel A shows an embodiment of a lanyard in use with a smartphone with an existing case. The exist of unbraided/unwoven strands can be seen through as opening in the case. Panel B shows an embodiment of a lanyard that is adhered to the inside of a case for a handheld device.
Figure 3:
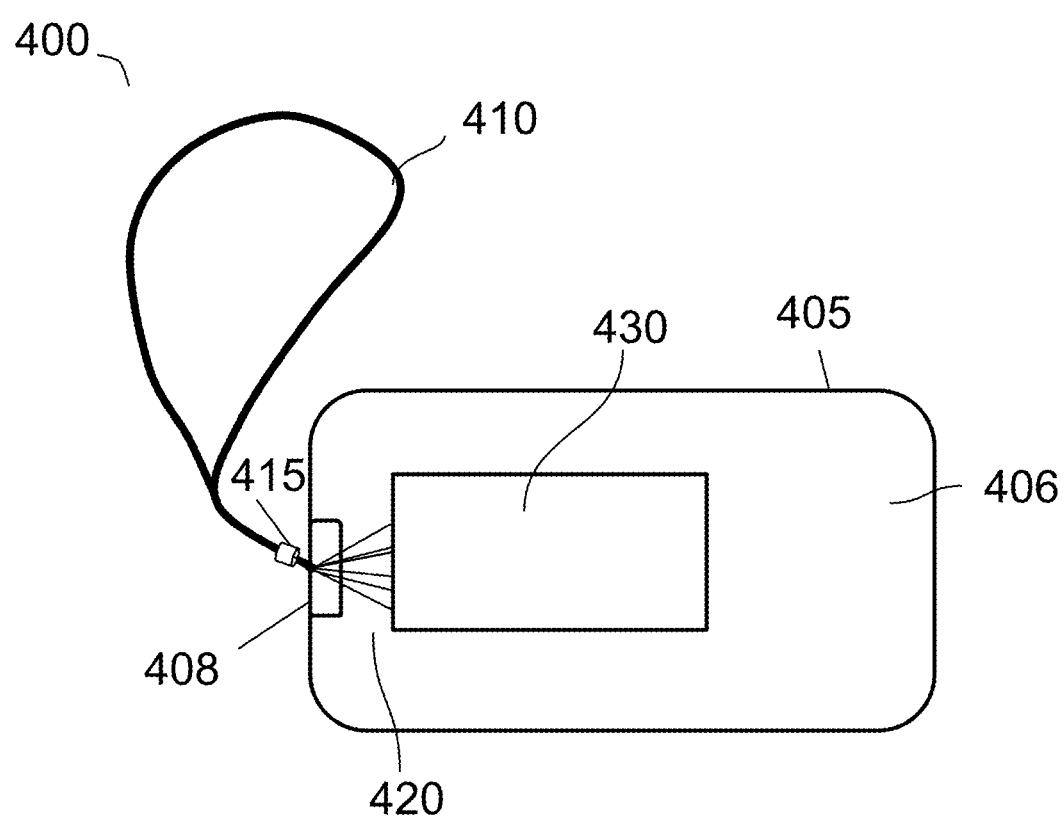

With further reference to the figures, FIG. 3A shows a lanyard in use with a handheld device that includes a tight-fitting case, the lanyard 300 is shown. The braided or woven loop 310 can be seen secured by the retainer at the junction 315. The unbraided strands can be seen exiting an opening 308 in the case 305. FIG. 3B shows an embodiment 400 of a lanyard that is attached via an adhesive to the inside of a case 405. The adhesive may be a 'permanent' adhesive or repositionable adhesive. As can be seen, the braided loop 410 is retained by a retaining clip at the junction 415. The strands in the separated section 420 pass through an opening 408 of the case, and the thin section 430 is attached to an inner surface 406 of the case 405. In other embodiments, in the absence of a case or cover, the adhesive could be attached directly to a handheld device (not shown).

Figure 4:
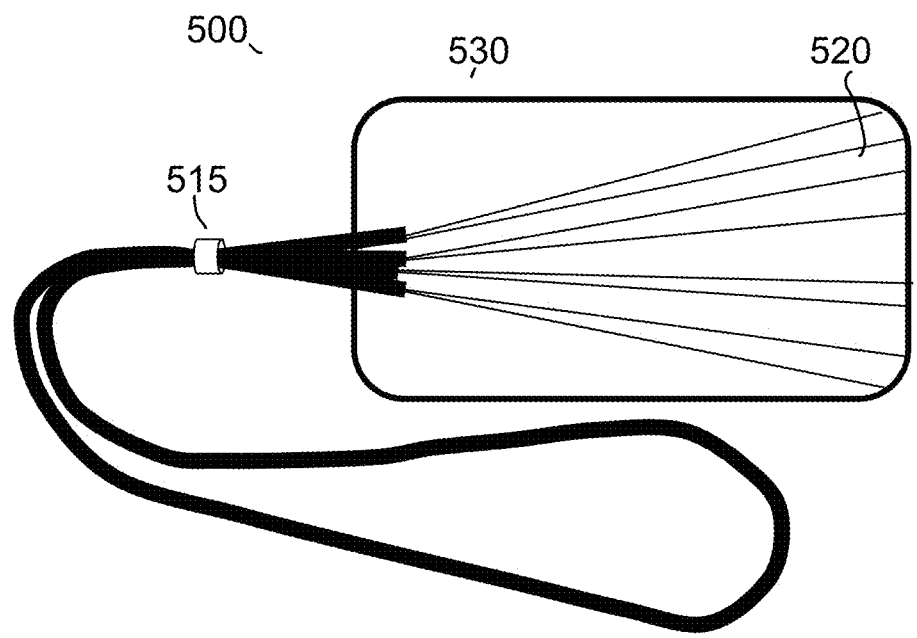
FIG. 4. Shows a detailed partial view of an embodiment of the lanyard. Panels A and B show the details of the separated strands embedded between two adhesive layers. Panel B includes the additional protective layer placed over the repositionable adhesive.
Figure 4:
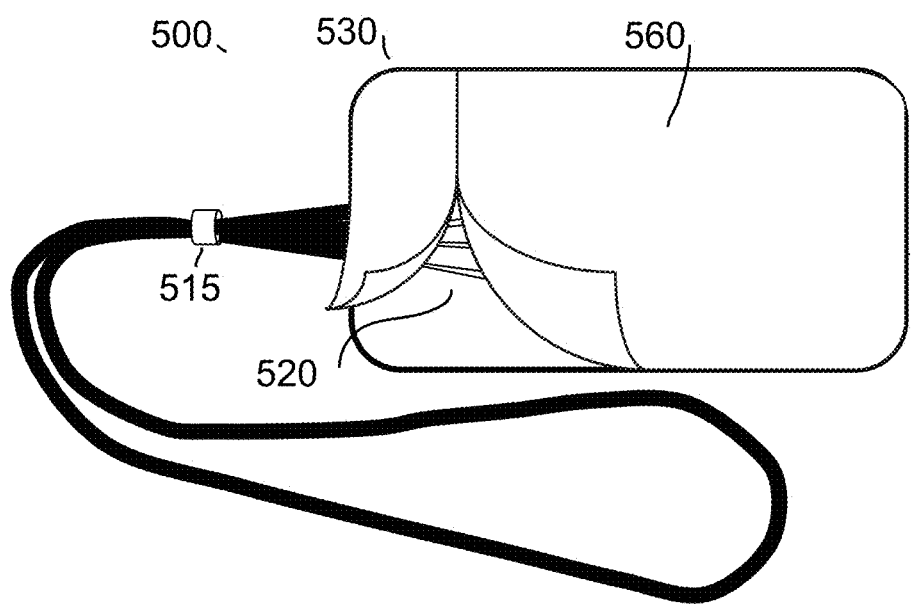

With further reference to the figures, FIG. 4A shows a detailed view of an embodiment of the lanyard 500. Junction 515 is a metal retaining clip that is crimped on to the lanyard. The separated section 520 can be clearly seen and the thin section 530 comprises the separated strands embedded between two permanent adhesive layers comprising the permanent adhesive side of a 3M 9425HT adhesive and the permanent adhesive layer of a 3M 7980 Sheet Polyester Label. The 'sandwich' comprises the foregoing adhesive layers with the separated strands embedded therebetween. The adhesive layers in the embodiment depicted are sufficiently transparent such that the separated strands are clearly visible. A repositionable adhesive layer is present on the outer surface (not shown/visible.)

FIG. 4B shows a similar view of lanyard 500 including the removable cover layer 560 on the repositionable adhesive on the outer portion of the thin section 530. As described above, the 3M 9425HT adhesive material comprises a permanent adhesive layer on one side or face, and a repositionable adhesive layer on the other side or face, and are well suited to use herein. The removable cover layer 560 covers the repositionable adhesive layer present on one outer face of the thin section 530 and may comprise one or more sections or pieces for ease of removal. Two such removable cover sections are depicted, in the figure, each has been partially peeled off to reveal the separated strands 520 embedded in the thin layer 530. The removable cover 560 is removed at the time of placing the repositionable adhesive in place to secure the lanyard to a mobile device or its case.

In yet another aspect of the disclosure, kits are provided comprising lanyards. The lanyards may be in accordance with either the first or second aspects as described in detail above. The kits further comprise one or more of a case or cover for a handheld digital device suitable for use with a lanyard, adhesives for attaching the lanyard to the handheld device, or the case or cover, instructions for use of the kit components, and links to a website or online audiovisual materials providing additional information on using the lanyard, or using the components of the kit.

In one embodiment the adhesives include repositionable and permanent adhesives. In another embodiments, the adhesives are on strips. In general, the adhesives (i.e. adhesive layers) are thin sheet materials such as strips, tapes, or adhesive labels.

The scope of the invention is set forth in the claims appended hereto, subject, for example, to the limits of language. Although specific terms are employed to describe the invention, those terms are used in a generic and descriptive sense and not for purposes of limitation. Moreover, while certain presently preferred embodiments of the claimed invention have been described herein, those skilled in the art will appreciate that such embodiments are provided by way of example only. In view of the teachings provided herein, certain variations, modifications, and substitutions will occur to those skilled in the art. It is therefore to be understood that the invention may be practiced otherwise than as specifically described, and such ways of practicing the invention are either within the scope of the claims, or equivalent to that which is claimed, and do not depart from the scope and spirit of the invention as claimed.

We claim:

1. A lanyard for a handheld electronic device comprising a first section comprising a region of braided or woven strands of fiber forming a loop therein of sufficient diameter and strength to secure the handheld device during use by a user;
   a second section comprising a plurality of strands extending from the first section that have been at least partially unbraided or unwoven from each other to form at least a part of a thin layer comprising the at least partially unbraided or unwoven strands substantially adjacent to each other; and
   a junction between the region of braided or woven strands and the at least partially unbraided or unwoven strands, the junction comprising a retainer for preventing the region of braided or woven strands from becoming unbraided or unwoven;
   wherein the unbraided or unwoven strands are adjoined, attached, or adhered, or embedded, in or on a remainder of the thin layer;
   and wherein the thin layer is adapted to fit between the handheld device and a form-fitting case for that particular handheld device.

2. The lanyard of claim 1 wherein the thin layer further comprises an adhesive layer for securing the lanyard to the handheld device, or a case or cover used therewith, wherein the adhesive layer is sheet material.

3. The lanyard of claim 2 wherein the adhesive layer comprises a one-sided or two-sided adhesive tape or label, wherein at least one side comprises a repositionable adhesive for removably securing the lanyard to the handheld device or a case or cover used therewith.

4. The lanyard of claim 3 comprising an additional adhesive layer wherein the unbraided or unwoven strands are embedded between the adhesive layer and the additional adhesive layer, and wherein at least the lanyard can be secured to the handheld device or a case or cover used therewith with one repositionable adhesive layer.

5. The lanyard of claim 1 further comprising an intermediate section between the first and second section wherein in the intermediate section the at least partially unbraided or unwoven strands are free rather than adhered or embedded.

6. The lanyard of claim 1 wherein the first section further comprises a leader portion comprising a plurality of strands or fiber disposed between the junction and the loop.

7. The lanyard of claim 1 wherein at least a portion of the fiber comprises polyurethane cord.

8. The lanyard of claim 7 wherein the polyurethane cord is a multistrand cord.

9. The lanyard of claim 8 wherein at least a portion of the cord is braided.

10. The lanyard of claim 1 further comprising a means of adjusting the loop size.

11. A lanyard for a handheld digital device comprising a plurality of fiber strands extending through at least a first, second, and third segment;
   the first segment having a plurality of braided or woven fiber strands collectively forming a loop adapted for securing the device to an operator of the handheld device;
   the second segment disposed between and connecting the first and third segments and comprising a region adapted for passing between the handheld device and a case or cover thereon or through an opening in the case or cover, wherein multiple fiber strands are substantially unbraided or unwoven therein so as to minimize the thickness of the second segment; and the third segment having a substantially flat region comprising at least a portion of the individual strands adjoined, attached, or adhered side-by-side, or embedded therein, the third segment being sufficiently thin so as to fit between the handheld device and a form-fitting case or cover thereon such that the case or cover can still be attached to the handheld device; and, a junction between the first and second segments comprising a retainer for drawing the unbraided or unwoven strands together or retaining the loop.

12. The lanyard of claim 11 further comprising a repositionable adhesive adapted for removably attaching the third segment to at least a portion of the handheld device that is covered by the case or cover thereon.

13. The lanyard of claim 11 wherein at least a portion of the fiber strands comprise yarns.

14. The lanyard of claim 11 wherein the fibers comprise metallic material, synthetic material, natural material, or any combination thereof.

15. The lanyard of claim 11 wherein at least a portion of the fibers are synthetic fibers comprising nylon or other polymers comprising aliphatic or semi-aromatic polyamides, Kevlar, polyester, polyethylene terephthalate (PET), polyamide, rayon, or a conjugation comprising polyester, polyamide, and polypropylene.

16. The lanyard of claim 11 wherein the retainer comprises a crimp or metal retaining ring.

17. A kit comprising a lanyard in accordance with claim 11, and one or more of a case or cover for a handheld digital device suitable for use with a lanyard;

at least one adhesive layer for attaching the lanyard to the handheld device, or the case or cover;

instructions for use of the kit components; and links to a website or online audiovisual materials providing additional information on using the lanyard, or using the components of the kit.

18. The kit of claim 17 wherein the adhesive layer comprises a repositionable adhesive or a permanent adhesive.

19. The kit of claim 17 wherein the adhesive layer comprises adhesive sheet material.

* * * * *